Jan. 28, 1964   R. C. STANLEY   3,119,268
LIQUID LEVEL INDICATING GAGE
Filed Aug. 29, 1961   2 Sheets-Sheet 2
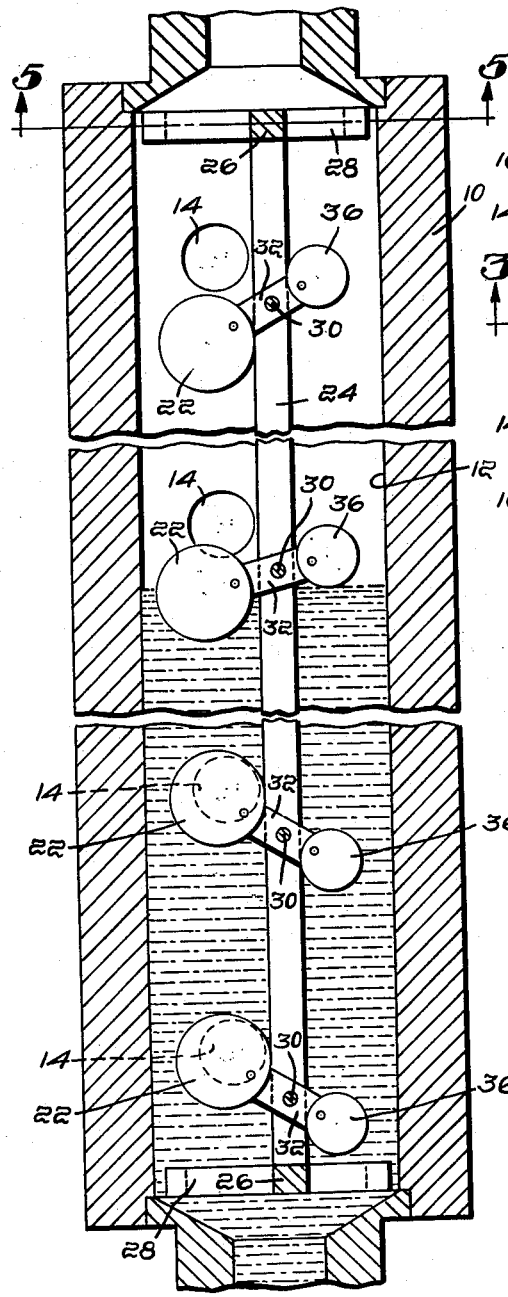
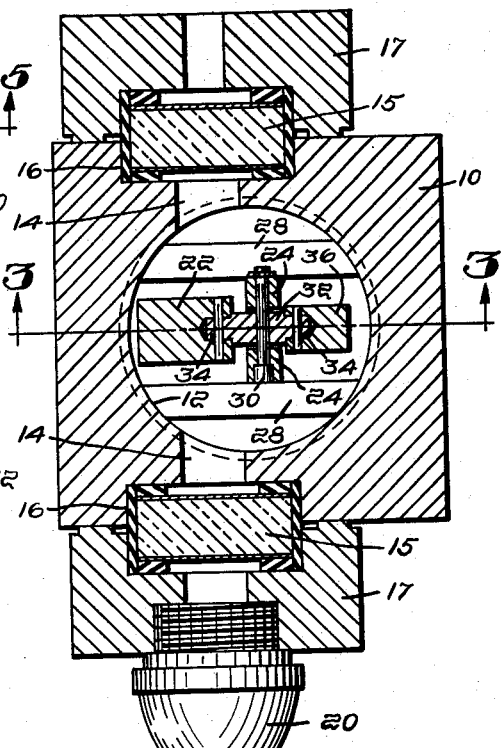
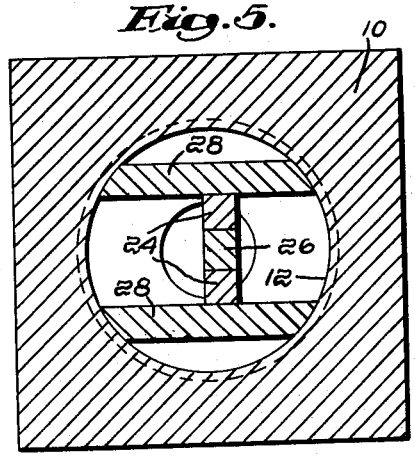
Inventor:
Robert C. Stanley,
By Emery, Booth, Miller & Townsend
Attys United States Patent Office 3,119,268
Patented Jan. 28, 1964

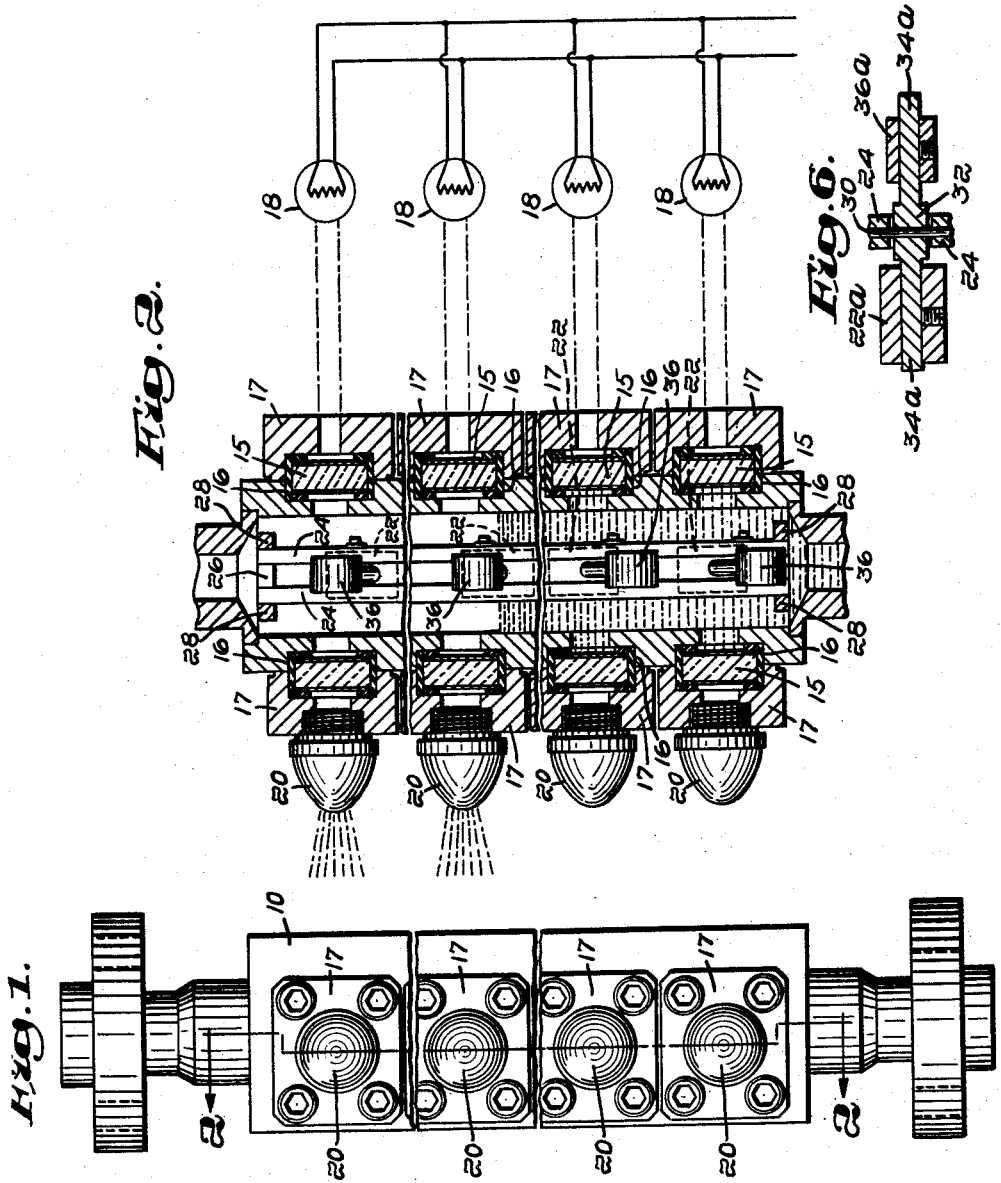

3,119,268
LIQUID LEVEL INDICATING GAGE
Robert C. Stanley, Westwood, Mass., assignor to White Sewing Machine Corporation, Cleveland, Ohio, a corporation of Delaware
Filed Aug. 29, 1961, Ser. No. 134,777
3 Claims. (Cl. 73—331)

This invention relates to a liquid level indicating gage to be read by direct ocular inspection, suitable for use with a high pressure steam boiler. At the present day "high pressure" may mean a pressure of as much as 1600 lbs. per square inch, with internal temperatures of over 600° F. and boiler water of a density of about two thirds of a gram per milliliter or even greater pressures. In a direct connected gage the temperatures will not exactly duplicate the internal temperatures of the boiler, but it will be convenient to ignore this.

In such an application the gage body, in communication at its ends with the steam containing and water containing spaces of the boiler to receive a column of liquid the height of which is taken as an indication of the height of water in the boiler, may, in order to withstand the pressures, be formed from a solid bar of steel drilled lengthwise to provide a chamber for the water column, and crosswise to provide vertical series of vision ports closed by small glasses ("bull's-eyes") suitably packed and secured by strong clamping frames. See, for example, Patent 2,510,729.

It is not easy to observe by reflected light what ports are below the water level and what above. If light is transmitted from back to front the transparency of the water is such that no marked contrast between the ports below the water level and those above is obtained.

In accordance with the present invention a series of "shutters" is arranged within the space which receives the water column, one for each pair of aligned ports, the individual shutters moving through a limited range in response to the variations of the water level so that they are interposed between the ports of a pair below the level and shut off the transmission of light, but are disaligned from them in the area above water level, resulting in a clearly distinguished series of bright spots above the water level in pronounced contrast to "dark spots" below. By a suitable rearrangement of centers the opposite effect (dark above, light below) may be obtained, but the former will be specifically disclosed herein.

My invention will be well understood by reference to the following description of an illustrative embodiment thereof shown by way of example, wherein:

FIG. 1 is a front elevation of a gage partly broken away;

FIG. 2 is a vertical section of the same on line 2—2 of FIG. 1 and includes a diagrammatic showing of illuminating means;

FIG. 3 is a vertical section on line 3—3 of FIG. 4 and in a plane at right angles to FIG. 2 and is on a larger scale than FIG. 2;

FIG. 4 is a transverse section on a plane through a pair of opposed ports 14, but showing a shutter S beneath turned to a horizontal position and also sectioned. This figure is on a larger scale than FIG. 3.

FIG. 5 is a section on line 5—5 of FIG. 3; and

FIG. 6 is a central section taken longitudinally of a modified design of shutter.

The drawing is a reasonably realistic representation of a functioning apparatus. It is not to scale. It is however drawn to a scale to accord with a part of the following description which sets forth dimensions at least not grossly inconsistent with practice and leading to formulas expressed in vulgar fractions which, if perhaps technically "complex" fractions, are in fact "simple" in the popular sense of that word and are susceptible of ready derivation and apprehension by anyone of moderate arithmetical knowledge who also understands the mensuration of simple geometrical solids and simple equations.

Referring now to the drawing, there is there shown a gage body 10, bored vertically to provide a chamber 12 to receive the water column, the chamber shown being of two inch diameter. At intervals the body is cross bored to provide ports 14 (one half inch in diameter). These are closed by transparent cylindrical "bull's-eyes" 15 received in counterbores 16, suitably packed, and held by substantial overlying frames 17 bolted in place. This construction is in itself old.

The windows at the rear side of the gage may be illuminated from the exterior as shown in FIG. 2 by diagrammatically disclosed lamps 18 and over the windows at the front may be mounted conoidal domes of faceted glass which glow when light reaches them from the rear, and which may be observed throughout a wide angle.

Arranged within the chamber is a series of shutters S, each having a limited range of movement between two positions in one of which (bottom of FIG. 3) a portion of the shutter, herein a "head" 22, is in alignment with a port. It has a vertical section of an area larger than the port, completely to shut out light from passing through the aligned ports. In the other position (top of FIG. 3) the head is disaligned from the port and light may pass.

Before proceeding to further description of the shutters it may be well to review some of the conditions under which we work. Space is limited. The shutters must be rugged and the movements imparted to them not complex. The materials used must be "resistant," which word characterizes a material which will not be dilapidated throughout a commercially useful life span by water and steam at the temperatures and pressures occurring in high-pressure steam boiler practice, and is used in that sense in the claims. In general parts must be rigid (generally solid) masses. For example, a hollow "float" like the ball which operates the flush tank of a water closet could not survive. The bodies involved are generally denser than water, that is, their mass (weight in air) much exceeds that of a body of water of equal volume. When "buoyancy" is referred to the word designates the upward force arising when a body is wholly or partly immersed in a liquid, equivalent to the weight of a volume of water equal to the immersed volume. The body need not float as does a "buoy" marking a channel. When a vessel lets go an anchor a buoyancy force arises as soon as it hits the water although the anchor will go all the way to the bottom.

In the example shown the set of shutters is organized on a common supporting frame comprising (see FIGS. 3 and 5) two uprights 24, spaced by spacing blocks 26 at their ends and carrying top and bottom cross pieces 28 corresponding to chords of the circular cross section of chamber 12. This frame with the shutters mounted thereon may be inserted into or withdrawn from the chamber from one end of the latter.

Herein the shutters S are in the form of levers of the first class, being pivoted between their ends on pivot pins 30 extending between the uprights 24 on which pivots the shutters freely turn.

The principle involved, and which dictates the mechanical design, is that the moment about center 30 (viewing FIG. 3) of the left-hand side of the shutter in "air" (top of the figure) slightly exceeds that of the right-hand side (enough to overcome the friction of the pivot, which is very small) so that the shutter swings counterclockwise to a stop in the position shown and uncovers the adjacent port 14. When immersed in water however (bottom of FIG. 3) the algebraic sum of the buoyancy forces on the two sides is such as to overcome this moment and to reverse the state of imbalance, so that the shutter swings clockwise and against a stop into the position shown at the bottom of the figure and the left-hand side is aligned with the adjacent port 14.

The shutters as shown have the general form of a dumbbell and comprise a central bar 32, herein turned down at its ends to provide tenons 34 on which are pinned the head 22 and a "counterweight" 36, both desirably in the form of right circular cylinders with their axes horizontal. The sides of the head 22 extend beyond the uprights 24 which thus provide stops limiting the range of swinging movement of the shutter.

In the example shown the two sides of the bar 32 whether taken with or without the tenons 34 are in neutral equilibirum. From the principles above set forth we deduce that while the mass of the head and counterweight need not be substantially different, their volumes and the displacements when submerged should be markedly different and that the density of the head 22 is much less than the density of the counterweight 36, especially when the arms of the balance are not markedly different.

As a material for the head 22 titanium, which has a density of 4.5, is suitable. Aluminum is less dense but not sufficiently resistant. For the counterweight 36 an alloy of 75% of tungsten, 7½% of nickel and 2½% of copper (available commercially from Kennametal Inc. of Latrobe, Pa., under the designation "Kennametal W 10") having a density of 17 (literally "heavier than lead") is recommended. The beam 32 may be made of a suitable grade of "stainless steel," density about 8.

I shall next analyze the mechanics of a schematic shutter formed from these materials in the dimensions corresponding to the drawing. I shall first assume that the head 24 and counterweight 36 are complete cylinders in some way attached at the ends of the central portion of the bar 32 with their centers of gravity at the midpoints of their axes. In computations of volume (and resultant displacement) this makes no difference. Also I refer to weight as weight in air, although in use the emersed body is "in steam." Dimensions are in inches.

The head 22 as drawn is a cylinder of titanium, diameter ¾, altitude ½.

The counterweight as drawn is a cylinder, diameter ½, altitude 11/32.

The ratio of volumes, head to counterweight, is 36 to 11 or more than 3 to 1. The ratio of the buoyancy forces, when both are submerged in water, is the same although the actual values of the forces depend on the density of the water.

Multiplying by the densities 4.5 and 17 respectively the ratio of weights in air is 162 to 187.

The axis of the head 22 is 21/32 from the center 30, that of the counterweight 36 only 17/32. Hence the ratio of moments is head to counterweight as 3402 to 3179. The head side "kicks the beam" in air.

When the shutter is submerged as at the bottom of FIG. 3, the algebraic sum of the buoyancy of head 22 exerted clockwise and the buoyancy of counterweight 36 exerted counterclockwise, the former about thrice the latter, reverses the state of imbalance and the shutter moves to a position with the left-hand side up and overlying a port.

Consider now a shutter as it lies in air (steam) as seen at the upper part of FIG. 3. Suppose the water to rise eventually to submerge it as at the bottom of the figure. If the shutter were stationary the water could rise to a level tangent to the bottom of the counterweighting mass 36, submerging substantially the entire volume of head 22. As the head is submerged a buoyancy force proportional to the volume of water displaced is set up, diminishing its downward moment. Thereafter as the counterweight submerges a counter buoyancy is set up, but as it arises from a segment of a much smaller cylinder the net clockwise force continues to increase.

After the buoyancy force on head 22 reduces its moment so that the pivoted shutter is in neutral equilibrium, then on further rise of water level the head will "float" and rise in the water without altering its displacement. It is like a boat floating in a canal lock basin which is being filled. The pivoted shutter swings clockwise to the position shown at the central portion of FIG. 3. The water further rising and acting unequally on the large volume head and small volume counterweight then reverses the equilibrium and the pivoted shutter moves to the position seen at the bottom of the figure.

In the construction illustrated a portion of each cylinder 22 and 36 has been removed and replaced by a tenon 34 of different density, but which tenons themselves are of equal weights and moments. This has the effect of reducing the weight of head 22 and moving its center of gravity outward from the center, somewhat increasing the lever arm. In the case of the counterweight the weight is likewise reduced and its center of gravity moved outwardly. The weights removed are in ratio to the densities.

The purpose of these figures has been to give a little more specific exposition of the principles involved, not to demonstrate a particular numerical problem. It is unnecessary to make further calculations. We may arrive at a final design by building a sample approximating the dimensions described. Shop practice may make it desirable to use decimal fractions. If the head side is not heavy enough so that in air the shutter S does not lie as shown at the top of FIG. 3 we may grind off a little metal at a base of the counterweight 36, which rapidly reduces its weight. That will also reduce its volume but that is desirable rather than not. We may then test it by submerging it in water and in petroleum ether naphtha, which has a density of .665, approximately that of boiler water at 1600 lbs. pressure if that is our extreme case. Unless we grossly overdo the submerged shutter will lie in the position shown at the bottom of FIG. 3. The resulting structure will serve as a prototype for duplication in commercial manufacture.

Another approach to the design problem is diagrammed in FIG. 6. Here the tenons 34a are made longer than the estimated diameter for the head. Diametrical holes through head 32a and counterweight 36a are provided. The bar including the tenons is in equilibrium. The moments may be adjusted by shifting head or counterweight or both along the tenons and securing them by setscrews as shown. The shorter projecting stub could then be cut off flush and the other shortened by the same amount. The adjustment will take care of any moment due to the presence of the setscrews. The volume relationship of head and counterweight, including the portions of the tenons enclosed therein, remains the same and the displacement or buoyancy ratios the same.

In the case of a pivoted shutter if, first, the head end has sufficient transverse area to cover the port when aligned therewith and has a sufficient range of movement to uncover it when moved away, second, if the head end has a preponderating moment in air and, third, if the volumes and lever arms are such as to provide an algebraic sum of buoyancy forces when the parts are submerged which reverses the condition of disequilibrium, then it is possible to juggle shapes, densities and lever arms in combinations almost limitless in number. The juggling could be laborious and the results unrewarding.

The use of flat ended bodies and specifically, cylindrical ones as illustrated, is believed to be particularly advantageous. The parts may be sliced from a cylindrical rod and, if necessary, adjusted in weight and volume by grinding the bases. Actual masses may be determined by weighing, and displacements by weighing in air and water.

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:
1. A liquid level indicator readable by direct ocular inspection and adapted for use with high pressure steam boilers, said indicator comprising a liquid-containing column such as a steel bar chambered lengthwise to provide a water column chamber space within a massive confining wall and having at opposite sides thereof aligned vertical series of small, vertically spaced, glazed openings providing for direct transmission of light through similarly placed openings of the two series and a series of shutters all parts of which are rigid massive bodies of resistant material having a density relative to water greater than one, which shutters are pivoted between their ends as levers of the first class for movement in a restricted arc on a vertical plane and including as a part of one arm of the lever a head moving into and out from alignment with a pair of openings and of sufficient area in the vertical plane to obstruct the passage of light in one of the positions, the other arm of the lever providing a counterweight, the moment about the center of the one or head-carrying arm being in air greater than that of the counterweighting arm likewise in air and the moment of the head-carrying arm being in water less than that of the counterweighting arm in water.

2. A liquid level indicator readable by direct ocular inspection and adapted for use with high pressure steam boilers, said indicator comprising a liquid-containing column such as a steel bar chambered lengthwise to provide a water column chamber space within a massive confining wall and having at opposite sides thereof aligned vertical series of small, vertically spaced, glazed openings providing for direct transmission of light through similarly placed openings of the two series and a series of shutters all parts of which are rigid massive bodies of resistant material having a density relative to water greater than one, which shutters are pivoted between their ends as levers of the first class for movement in a restricted arc on a vertical plane, one arm of the lever having a portion having a vertical section of greater area than that of the openings and moving into alignment with the same at one extreme of the arc of movement, the other arm of the lever forming a counterweight, the mass of the first arm multiplied by the distance of its center of mass from the pivotal center being somewhat greater than the product of the mass of the other arm multiplied by the distance of its center of mass from the pivotal center but the volume of the said one arm being much greater than that of the said other arm, said series of shutters being mounted on a vertical frame for insertion into or withdrawal from the chamber space endwise as an assembly unit.

3. A liquid level indicator readable by direct ocular inspection and adapted for use with high pressure steam boilers, said indicator comprising a liquid-containing column such as a steel bar chambered lengthwise to provide a water column chamber space within a massive confining wall and having at opposite sides thereof aligned vertical series of small, vertically spaced, glazed openings providing for direct transmission of light through similarly placed openings of the two series and a series of shutters all parts of which are rigid massive bodies of resistant material having a density relative to water greater than one, which shutters are pivoted between their ends as levers of the first class for movement in a restricted arc on a vertical plane, one arm of the lever having an enlargement which at one extreme of the pivotal movement of the shutter will be aligned with one of the openings, the enlargement being in the form of a cylinder having an axis parallel to the pivotal axis and having a base with a vertical section of greater area than that of the openings, and being of a resistant material of relatively low density as for example titanium the other arm of the lever having a counterweighting mass in the form of a cylinder parallel to the first, the counterweighting mass being of a resistant material much denser than that of the enlargement as for example an alloy of tungsten with lesser portions of nickel and copper and being of much smaller volume, the mass of the first arm multiplied by the distance of its center of mass from the pivotal center being somewhat greater than the product of the mass of the other arm multiplied by the distance of its center of mass from the pivotal center.

References Cited in the file of this patent
UNITED STATES PATENTS

| | | |
|---|---|---|
| 1,308,620 | Broad | July 1, 1919 |
| 1,408,218 | Martin | Feb. 28, 1922 |

FOREIGN PATENTS

| | | |
|---|---|---|
| 1,616 | Great Britain | 1873 |
| 271,172 | Great Britain | Mar. 23, 1927 |